Figure 4:
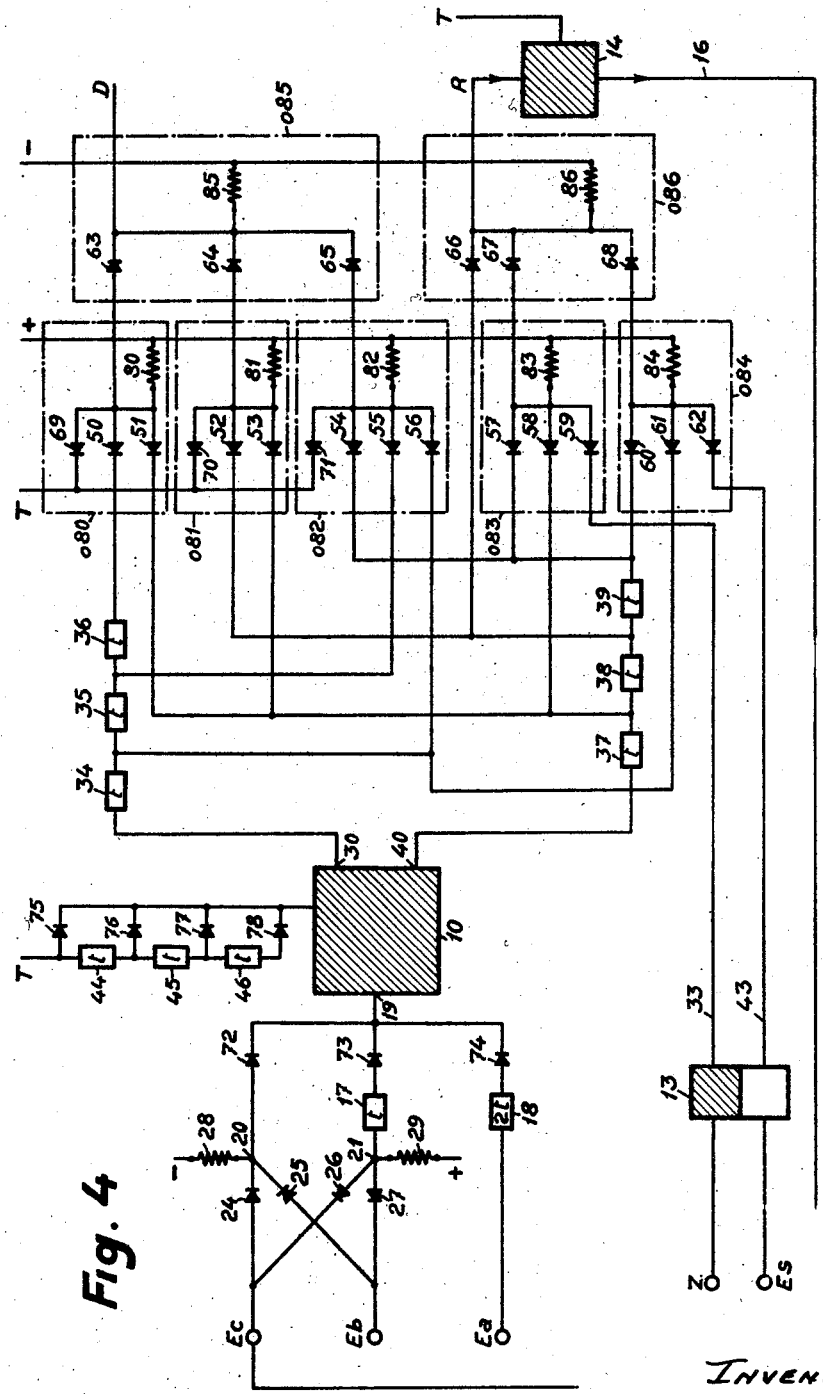

Feb. 19, 1957     P. J. C. CHENUS     2,781,968
ADDITION AND SUBTRACTION OPERATING DEVICE FOR ELECTRIC
CALCULATING MACHINES OPERATING IN THE BINARY SYSTEM
Filed April 5, 1952                              3 Sheets-Sheet 1
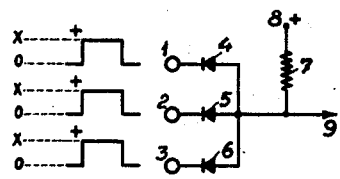
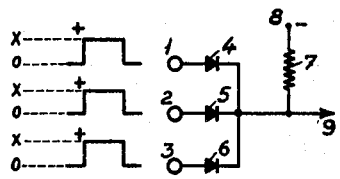
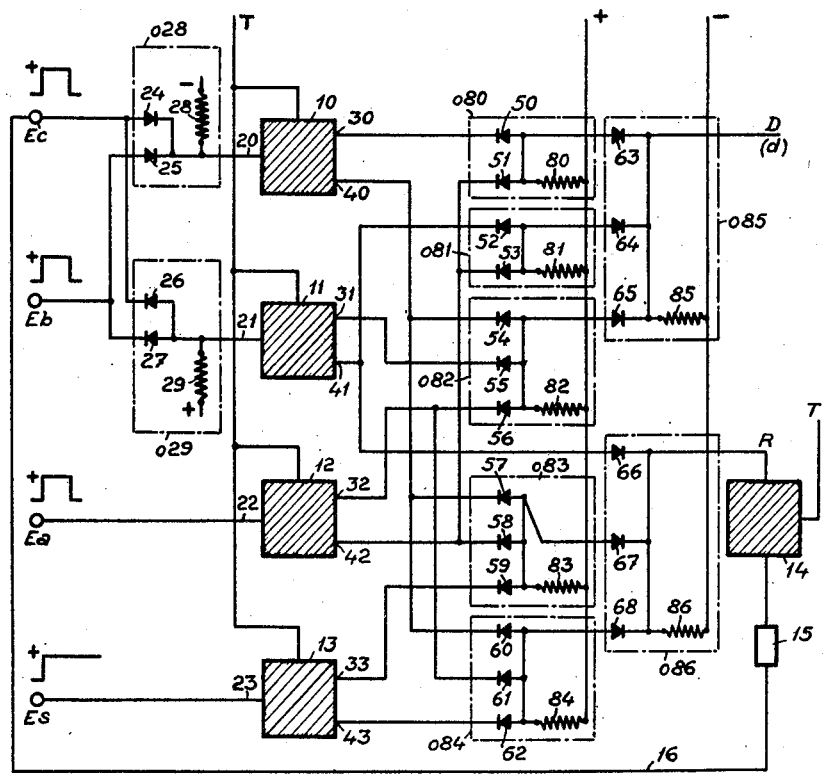
INVENTOR
PIERRE JACQUES CHARLES CHENUS
BY:
Haseltine, Lake & Co.
AGENTS INVENTOR
PIERRE JACQUES CHARLES CHENUS
BY: Hazeltine, Lake & Co.
AGENTS Feb. 19, 1957 P. J. C. CHENUS 2,781,968
ADDITION AND SUBTRACTION OPERATING DEVICE FOR ELECTRIC
CALCULATING MACHINES OPERATING IN THE BINARY SYSTEM
Filed April 5, 1952 3 Sheets-Sheet 3

United States Patent Office 2,781,968
Patented Feb. 19, 1957

2,781,968

ADDITION AND SUBTRACTION OPERATING DEVICE FOR ELECTRIC CALCULATING MACHINES OPERATING IN THE BINARY SYSTEM

Pierre Jacques Charles Chenus, Paris, France, assignor to Compagnie des Machines Bull (Societe Anonyme), Paris, France Application April 5, 1952, Serial No. 280,820

Claims priority, application France April 11, 1951

8 Claims. (Cl. 235—61)

The present invention concerns devices suitable for use in electric calculating machines operating in the binary system, in which the numbers dealt with by the machine take the following form:

$$a_0 2^0 + a_1 2^1 + a_2 2^2 + \ldots a_n 2^n$$

in which the coefficient $a_0, a_1, a_2 \ldots a_n$ of the successive binary orders can only take the value 1 or 0 and are respectively represented by either an impulse, regulated in time by a time difference with respect to a suitable origin proportional to the rank of the binary order considered, or by the absence of this impulse. The times characterizing the successive binary orders are marked by pilot signals regularly spaced apart by one binary period, which are called "timing signals." For the sake of simplicity, it will be stated in the following that the impulses representing the numbers are "coded."

The invention has for its object to provide a device which simultaneously receives two trains of coded electric impulses representing two numbers to be added or subtracted and supplying, according to the case, the sum or the difference of these two numbers in the form of coded impulses. Such a device will generally be provided with two inputs, one for each of the two numbers to be entered, and with one output for the result, and it will in addition comprise a special control means so as to function according to requirement as and adding or subtracting device, generally by the application of electric voltage, and an input for the timing signals.

As will be seen, the performance of the invention involves a number of original features, the most interesting of which are the following:

The said impulses are mixed "in parallel" in the said device and exploited by switching circuits which perform the combinations "and" and "or" logical concepts.

The said switching circuits preferably consist of unidirectional elements and resistances connected to voltage sources.

Preferably the device is arranged in such a manner that there is no more than one "and" switching circuit and one "or" switching circuit connected in series.

Switching circuits respectively embodying the "and" and "or" logical concepts will be hereinafter termed "and" gates and "or" buffers.

According to the preferred embodiment of the invention, the said device comprises one "and" gate and one "or" buffer for receiving pulses representative of one of the terms and of the carry-over internally formed in the device, three regenerators each supplying, in agreement with a timing signal, an impulse on either of two lines which indicate respectively the presence and absence of and impulse applied to the regenerator, means for feeding voltage to one of two different lines according to whether the device is operating by addition or by subtration, five "and" gates and two "or" buffers and a delay channel for the reintroduction of the carry-over impulses.

According to a modification of the said preferred embodiment, the three regenerators are combined into one and the impulses applied thereto are separated from one another in time by means of delay elements, the delay of which is less than one binary period and which are suitably arranged in the device.

Another object of the invention is the realization of a simplified operator device, receiving two coded impulse trains simultaneously at two different inputs, these impulse trains representing two numbers to be added or substracted, this device provides either the sum or the difference of these two numbers, according to the case, in the form of coded impulses. With a view towards the realization of this "operator," the present invention also provides a simplified diagram of an impulse regenerator, by way of a non-limitative example.

The invention will be more fully understood from the explanations hereinafter given with reference to Figures 1 and 2, which show respectively the circuit diagrams of an "and" gate and of an "or" buffer, and to Figure 3, which shows the circuit diagram of the device according to the preferred embodiment of the invention. A modification of this embodiment is also given in Figure 4.

Figure 5:
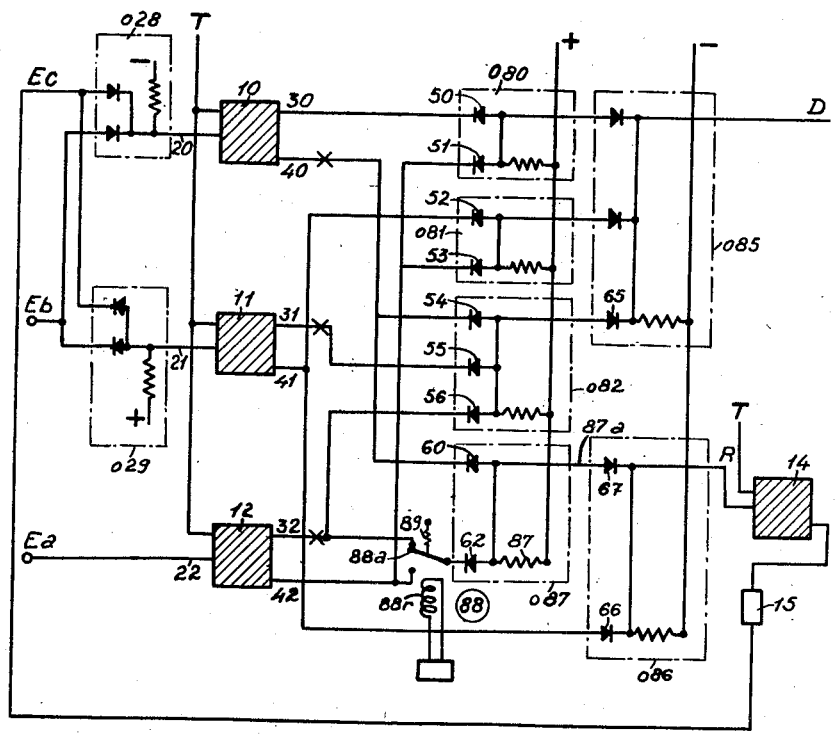
Figure 6:
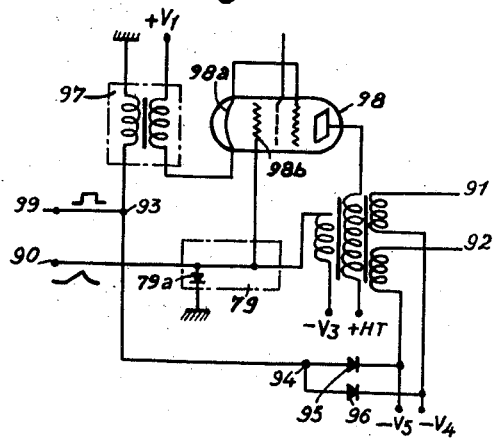

Figure 5 shows a diagram of a simplified operator device and Figure 6 shows a diagram of the aforementioned regenerator.

It will be assumed that A and B are two terms of the operation, to which there corresponds for each binary order an impulse (1) or the absence of an impulse (0), which impulse will be designated by $a$ and $b$ respectively for A and B. These impulses are applied to the inputs E$a$ and E$b$ of the device (Figure 3). The carry-over impulse $c$ supplied by the actual device and emanating from the earlier binary period is applied to the input E$c$. A voltage (S) is applied to a fourth input E$s$ only when the device operates as a subtracting device; in the absence of voltage (S), it operates as an adding device. The said impulses and voltages applied to the inputs are assumed to be positive. There is taken from the output D at each instant of the timing signal an impulse $d$ (i. e. 1 or 0 impulse) characterizing a binary order of the result. It will readily be seen that $d$ has the same value in addition as in subtraction. The carry-over impulse first appears in the device at R, and this may be a subtraction carry-over $rs$ or an addition carry-over $ra$ which is re-applied at E$c$ after having undergone a delay of one period. The eight different possible cases are included in the following table:

|         | I | II | III | IV | V | VI | VII | VIII |
|---------|---|----|-----|----|----|----|----|------|
| $a$     | 0 | 0  | 0   | 0  | 1  | 1  | 1  | 1    |
| $b$     | 0 | 0  | 1   | 1  | 0  | 0  | 1  | 1    |
| $c$     | 0 | 1  | 0   | 1  | 0  | 1  | 0  | 1    |
| $d$     | 0 | 1  | 1   | 0  | 1  | 0  | 0  | 1    |
| $ra$ (S=0) | 0 | 0  | 0   | 1  | 0  | 1  | 1  | 1    |
| $rs$ (S=1) | 0 | 1  | 1   | 1  | 0  | 0  | 0  | 1    |

It is to be noted that $b$ and $c$ fulfill a symmetrical function, so that it may in fact be considered that there are only six distinct case, cases II and III on the one hand and VI and VII on the other hand being analogous. Moreover, the number B is assumed to be smaller than A in the following in order that the subtraction may have a meaning.

It will be expedient first to refer to Figures 1 and 2, which show known combinations of rectifiers and resistances permitting of producing the conditions "and" and "or" respectively with respect to the positive pulses applied thereto.

In Figure 1, 8 is a terminal to which there is applied a positive voltage of high value in relation to the impulses applied at 1, 2 and 3. The terminal 8 is connected to a resistance 7 of suitable value, which is in turn connected in shunt at its other end to three unidirectional elements (diodes or dry rectifiers) 4, 5 and 6. The other terminals 1, 2 and 3 of these rectifiers are connected to sources of sufficiently low impedance for the signal supplied by these sources to be practically independent of the output. The potential of the said sources may take two levels O and X indicated opposite the corresponding terminals. If at least one of the terminals is at the potential level O, for example the terminal 2, the element 5 is equivalent to a short-circuit for the impulses which might be applied to one or more of the other terminals (that is to say, 1 or 3). In order that an impulse may pass through 9 when applied to a circuit of suitable impedance, positive impulses must be simultaneously applied to 1, 2 and 3. This means that the circuit arrangement of Figure 1 translates the condition "and" (1 and 2 and 3).

On the other hand, in the circuit of Figure 2, in which the unidirectional elements are connected in the opposite direction, a high negative voltage being applied at 8, it is sufficient for a positive impulse to be applied to 1 or 2 or 3, or simultaneously to a number of these terminals, in order that this circuit arrangement may transmit an impulse through 9 to a circuit of suitable impedance, that is to say, the circuit arrangement of Figure 2 translates the condition "or."

Naturally, the number of terms entering each "and" gate and "or" buffer, which is three in Figures 1 and 2, is not limited. These circuit diagrams can be extended without difficulty to any number of terms by providing a corresponding number of input paths and unidirectional elements.

Referring now to Figure 3, it will be seen that apart from the members bearing the reference numerals 10 to 16, the whole circuit arrangement is built up with "and" gates and "or" buffer of the types shown in Figures 1 and 2. In fact, they may be classified as follows:

(26, 27, 29), (50, 51, 80), (52, 53, 81), (54, 55, 56, 82), (57, 58, 59, 83), (60, 61, 62, 84) constitute "and" gates.

(24, 25, 28), (63, 64, 65, 85), (66, 67, 68, 86), constitute "or" buffers.

For the sake of simplicity, these circuits will hereinafter be designated by the letter O followed by the reference of the resistance. Thus, O81 means (52, 53, 81). These circuits are enclosed in a dot-and-dash line in the drawing.

Thus, in the case of impulses applied to Eb and Ec, an impulse will be found at 21 only if b and c are simultaneously present, and an impulse will be found at 20 if there is at least one impulse b or c, owing to the presence of the circuits O28 and O29.

The members 10 to 13 indicated by rectangles are regenerators having low output impedance, which receive at the same time as the impulse or voltage applied to 20, 21, 22 or 23 a regularly recurrent impulse T, called a timing impulse, which always leaves the regenerator along one of two lines 30 or 40, 31 or 41, 32 or 42, 33 or 43. An impulse leaving along the lower line (40 to 42) translates the existence of an input impulse (at 20 to 22) at the regenerator, while an impulse leaving along the upper line (30 to 32) translates the absence of an input impulse, the said existence or absence being shown at the instant marked by the timing impulse. In a like manner, when a voltage (S) is applied to regenerator 23, i. e. in the case of subtraction, an impulse is present on line 43 for every timing impulse, while no impulse appears on line 33; whereas, in the case of addition, the impulses appear on line 33 and not on line 43.

It will be shown, by successively taking the 6 distinct cases hereinbefore referred to, that the device actually supplies the required results for $d$ and $r$ ($=ra$ or $rs$ respectively according to the case of addition or subtraction).

The case I will first be assumed, in which $a=b=c=0$. There is no impulse at 40, 41 and 42. Therefore, none of the "and" gates situated at the right hand side of the regenerators 10—13 can allow an impulse to pass due to the existing connections.

The case II will then be assumed, in which $a=b=0$ and $c=1$. An impulse is set up at 40, 31 and 32, and no impulse is set up at 30, 41 and 42. O82 allows an impulse to pass because it receives an impulse at each of its three inputs, while O80 and O81 remain blocked. O83 is blocked because it receives nothing at 58. O84 receives the impulse from 32 and the impulse from 40, and O84 is therefore open or blocked according to whether or not there is an impulse at 43, that is to say, it allows an impulse to pass in the case of subtraction and none in the case of addition. O85 and O86 produce "or" conditions, and thus $d=1$, $ra=0$, and $rs=1$.

The case IV (III being identical to II) will now be assumed, in which $a=0$ and $b=c=1$. An impulse is set up at 40, 41 and 32. O80, O81 and O82 are blocked each having at least one unfed input, while an impulse always passes through 66 since 41 emits an impulse, both in the case of addition and in the case of subtraction. Thus, $d=0$, and $r=1$.

The case V will now be assumed, in which $a=1$, and $b=c=0$. An impulse occurs at 30, 31 and 42, while no impulse occurs at 40, 41 and 32, and it therefore follows that O80 allows an impulse to pass, while O81 and O82 are blocked. Since there is no impulse at 40, the rectifiers 57 and 60 are not fed. O83 and O84 are blocked. The result is thus $d=1$, and $r=0$.

The case VI will now be assumed, in which $a=c=1$, and $b=0$. An impulse occurs at 40, 31 and 42, and no impulse occurs at 30, 41 and 32. Consequently, O80, O81 and O82 are blocked: $d=0$, while O84 is blocked and O83 allows an impulse to pass only in the case of addition: $ra=1$, and $rs=0$.

Finally, the last case will be assumed, in which $a=b=c=1$. An impulse occurs at 40, 41 and 42, and no impulse occurs at 30, 31 and 32. O80 and O82 are blocked, but O81 allows an impulse to pass. A carry-over impulse passes through 66 both in the case of addition and in the case of subtraction. Thus $d=1$ and $r=1$.

The internal carry-over $r$ produced in the device and supplied at R having to be restored to a form for reapplication to Ec through 16, it is passed into a regenerator 14 to which a timing signal T is also applied, and then through a delay element 15 which delays it by one binary period. It is expedient to make the following observations regarding the device hereinbefore described:

The same circuit arrangement could be produced with other elements (for example multi-grid electronic valves, combinations of valves or magnetic circuits), for constituting the "and" gates and "or" buffers without departing from the scope of the invention, but it is obvious that dry rectifiers, and more especially germanium cells, provide a particularly convenient and stable construction:

There is not more than one "and" gate and one "or" buffer in series between two regenerators or like utilisation devices, which is a technological condition to be recommended in practice.

The presence of an actual regenerator at 13 is not essential, it being sufficient to have either at 33 or at 43 a voltage produced by any appropriate means, respectively according to the case of addition or subtraction.

It is possible to have only one regenerator instead of three regenerators 10, 11 and 12, the impulses $a$, $b$, and $c$ then being caused to arrive with time-displacement and thereafter being re-grouped in the "and" gates connected beyond the single regenerator, by means of judiciously disposed delay elements. Figure 4 illustrates such a modification. In this modification, the elements of Figure 3 employed in the diagram of Figure 4 for analogous functions bear the same references. 10 replaces 10, 11 and 12. 13 is, for example, an electronic trigger of low output impedance on which there acts in asymmetrical fashion at Es a control signal which can be selected at a given instant before the operation, and only in the case of subtraction, so as to supply a voltage at 43 at this instant. The said trigger is returned into the position for addition (voltage only at 33 by an end-of-operation signal at Z).

There may arrive at the common input 19 of the regenerator 10: an impulse "$a$" delayed by $2t$ through 18 and 74; an impulse delayed by $t$ through 17 and 73 if $b$ and $c$ are simultaneous; an undelayed impulse through 20 and 72 in the case of the existence of at least $b$ or $c$. To this end, the binary period is divided into $3t$ and impulses derived from the timing signal are applied at times ($0$, $t$ and $2t$) which are submultiples of the binary period due to a delay line 44, 45, 46 and unidirectional elements 75 to 78. The delay elements 34 to 39, the value of the delay of which is $t$, are interposed in the connections which lead them to the inputs of the switching circuits O80 to O84 so that the impulses arrive there at the time $3t$, that is to say, at the end of one binary period calculated from the application to Ea, Eb, Ec, that is to say, in coincidence with a timing signal. This coincidence, which permits the passage of the impulse representing $d$, is ensured by a timing signal applied to a supplementary unidirectional element 69, 70, 71 incorporated in each of the "and" gates O80 to O82. For the carry-over impulse, the said coincidence is ensured by the timing signal applied to the regenerator 14 at T. Since there is a displacement of one binary period in the actual device, the delay element 15 of Figure 3 does not exist in the return path 16 in Figure 4.

It has been assumed for the sake of simplicity throughout the foregoing that the regenerators do not themselves introduce any delay. This need not be the case in practice and the values of the delays 15 (Figure 3) and 34 to 39 (Figure 4) will then have to be modified accordingly.

It is obvious that it is possible, if desired, to reverse the polarities of all the voltages in the circuit diagrams and at the same time the directions of the unidirectional rectifiers, the regenerators then being adapted to transmit negative impulses.

Other details may be varied in the circuit diagrams of Figures 3 and 4 without departing from the scope of the invention. The device may obviously be adapted for addition or subtraction alone, or for arithmetical operations requiring the repetition of additions and subtractions by means of return circuits comprising delay elements.

The diagram shown in Figure 5 is similar to the diagram shown in Figure 3. The corresponding elements bear the same references.

Blocks O80—O81—O82—O87—O29 constitute "and" gates.

Blocks O85—O86—O28 constitute "or" buffers.

Regenerators 10, 11 and 12 receive positive timing signals T at the same time as they receive impulses called "input impulses" whose form is to be regenerated. The impulses provided at the output of the regenerators only react upon subsequently connected gates and regenerators if their voltage V goes beyond a certain value $V_0$, these are then said to be authorization impulses. An authorization impulse leaving the lower lines 40, 41 and 42 indicates the existence of an "input impulse" entering the regenerator by way of 20, 21 and 22; an authorization impulse leaving upper lines 30, 31 and 32, indicates the absence of an input impulse at the time of reception of a timing impulse.

When one output of a regenerator does not produce an authorization voltage, it is in a state of voltage which may be called interdiction voltage, in view of its action on switching circuits and regenerators, which are subsequently controlled by this voltage.

The innovation of the invention in this variation consists in a simplification of the channel for forming carry-over impulses.

This channel includes only one "and" gate O87, one "or" buffer O86 and one reverser 88, between the entry regenerators 10, 11 and 12 and carry-over regenerator 14, the reverser is shown in the rest or subtraction position, which is brought about by means of a relay. This relay makes it possible to feed the lower input 62 of gate O87, having two inputs, by means of the upper output 32 or by the lower output 42 of regenerator 12, according to whether the operator functions by subtraction or addition. The other input, which corresponds to unidirectional cell 60 of the same gate O87, is immutably connected to the lower input 40, of the other regenerator 10. The output 87a of gate O87, which is connected to the input of cell 67 of buffer O86, is able to provide a carry-over impulse, while the other input (cell 66 of this buffer O86) is connected to lower output 41 of regenerator 11, aforementioned. Blade 88a of reverser 88 is continuously submitted to the traction of spring 89, and during the additions submitted to the contrary action of relay 88r, in such a way as to be applied against the working contact of reverser 88. Spring 89, brings it back to the position shown in the figure, during the subtractions. Reverser 88 may also be directly controlled by a mechanical organ, or it may be of the electronic type.

Given: $a$ and $b$, positive impulses of a determined binary order, belonging to the two trains to be added or subtracted, $c$, the carry-over impulse, formed in the operator in the preceding binary period, $d$, the impulse representing the result, $ra$ or $rs$, the carry-over impulse according to whether the operator executes addition or subtraction.

Among the various possibilities already indicated in the table here shown; for example, let us consider case II, $a=b=0$ and $c=1$. (The calculation ($a-c$) is wanted.) A positive authorization impulse appears at 40, 31 and 32 (this is represented by a cross on the corresponding line); no impulse appears at 30, 41 or 42. Gate O82 allows a positive numerical impulse to pass, since this gate receives identical impulses at its three inputs, while gates O80 and O81 remain blocked, since they receive no impulses. A result impulse is then transmitted by O82 through O85 to D. The reverser being in the position shown in the diagram (subtraction), gate O87 receives a positive impulse at each of its inputs and transmits a similar impulse which passes through 67, causing a carry-over. In cases of addition, it is blocked, because output 42 remains at an interdiction voltage. The result indicated in the table is in fact reached $d=1$, $ra=0$, $rs=1$.

It is not difficult in using the same method, to verify the fact that in all cases, the results given in the table are exactly those provided by the operator.

In the present invention, the impulse regenerator, diagrammatically represented by Figure 6 is essentially comprised of a pentode 98, the cathode 98a of which is connected to terminal $+V_1$ through the secondary winding of a transformer 97. The construction of transformer 97 is such that, when a positive timing signal is received by terminal 99, an induced negative-going impulse is applied to cathode 98a.

At rest, the control grid 98b is held to a negative potential due to its connection to terminal $-V_3$, through the feed-back secondary winding of the output transformer. The positive input pulses, whose form is to be reshaped and which represent either terms of the operation or carry-overs, are applied to the control grid 98b from the input terminal 99. A rectifier cell 79a limits the upper potential level of said input pulses to the level of ground. Outputs 91 and 92 of the regenerator are in the rest condition brought to voltages $-V_4$ and $-V_5$, with $-V_5$ being far below value $V_0$ and $-V_4$ being slightly lower than value $V_0$, necessary for the following regenerator (not represented) to be energized, this regenerator usually being connected to the said outputs through elements of the device. These outputs are connected in parallel to input 99, by the connections 93—94 and by rectifier cells 95 and 96. During each timing impulse of an amplitude of $+V_2$, and in the absence of numerical impulses to be regenerated, outputs 91 and 92 are brought to voltages $-V_4+V_2=+V_7$ and $-V_5+V_2=-V_6$ respectively. The voltage $-V_6$ is lower than the minimum required value $V_0$, while $V_7$ is higher than $V_0$. When inputs 99 and 90 simultaneously receive a timing impulse and an input impulse, the regenerator and the secondary windings of the transformer are calculated so as to provide a supplementary voltage for windings equal to $(-V_4+V_5)$ in such a way as to obtain at output 92, a voltage $$-V_5+V_2+(-V_4+V_5)=V_2-V_4=+V_7$$

and at output 91, a voltage $$-V_4+V_2-(-V_4+V_5)=V_2-V_5=-V_6$$

i. e. the voltages obtained in the case here in question are permuted, with respect to the case where no input impulse is received, in coincidence with a timing impulse.

It goes without saying that the present realization of the regenerator, represented by Figure 6, is merely a non-limitative example.

It will be apparent that, in all the described embodiments, the chief function of the so-called regenerator is to manifest the logical concepts "Yes" and "No," that is "Yes" when an input impulse is being applied to the regenerator input, and "No" when no input impulse is applied to the regenerator input. In the arrangement of Fig. 6, 92 represents the output "Yes" and 91 represents the output "No."

Any other "Yes" and "No" arrangement which allows for the obtaining of results similar to those obtained by the regenerator shown in Figure 6 may be used in realizations of Figures 3 or 5, without departing from the scope of the invention.

It is worth noting that in another variation of the regenerator, it is possible to completely do away with cells 95 and 96, as well as the timing voltages applied to them.

With this variation, the operator device operates in an equivalent fashion, as will now be explained. In this case (the connections 93—94 and the cells 95 and 96 being removed), the regenerator operates in a slightly different manner, which is as follows:

At rest, in the absence of any signal (either timing or input signal), one output channel (91) of the regenerator is at an authorization voltage, and the other (92) at an interdiction voltage, in relation to subsequently connected gates and regenerators, as has already been mentioned, the voltage values being appropriately chosen. If a timing signal is applied singly, without any input signal, nothing is changed. On the other hand, if a timing signal and an input signal are applied simultaneously, the direction of the transformer coil windings and the number of wire turns being appropriate, and since the tube provides enough current, the authorization and interdiction voltages are exchanged in the two channels.

It is obvious that such regenerators, placed at 10, 11 and 12, provide the same results in the operator as does a regenerator of the first type (Figure 6 for example). It is assumed that at rest, the upper lines (30, 31 and 32) represent the outputs of regenerators normally at an authorization voltage, while the lower lines (40, 41 and 42) are at an interdiction voltage. If with the Figure 5 operator, $a=b=c=0$ (case 1), all the "and" gates are blocked by interdiction voltages applied at 51 and 53 coming from 42, and at 54 and 60 coming from 40, no impulse is emitted at D.

For example, $a=b=0$ and $c=1$, which comprises case II, which has already been examined. Lines 40, 31 and 32 are at an authorization voltage, and an impulse is created at line 40 as a result. This impulse is applied at 54; 55 and 56 being at an authorization voltage, an impulse is emitted at the output and is applied at 65. On the other hand, O80 and O81 remain blocked. The impulse applied at 60 produces an impulse at 67 because 62 is at an authorization voltage, in the case of subtraction. In cases of addition, the impulse applied at 60 cannot pass through. The following results, corresponding to the table are obtained: $d=1$, $ra=0$, $rs=1$.

By using the same method, it is easy to verify that in all necessary cases, impulses of authorization voltage are created, which are associated with the already existing authorization voltages, and which when applied to gates and buffers, provide the results indicated by the table.

I claim:

1. Algebraic serial adder for adding or subtracting a binary number B to or from a binary number A, said numbers being represented by respective trains of entry pulses B and A, said adder comprising three pulse receiving "YN" devices, having each two outputs Y and N adapted to separately manifest the reception of an entry pulse and the non-reception of an entry pulse, the first YN device being connected to an input of the adder for uniquely receiving the pulses A; the second YN device receiving, from two other inputs of the adder, the pulses B and carry pulses C produced by the adder itself, through a first "and" gate; the third YN device receiving said pulses B or said pulses C through a first "or" buffer; a pair of two-input "and" gates and one three-input "and" gate the inputs of which are differently connected to the outputs of said three YN devices; a second "or" buffer the inputs of which are connected to the outputs of said two-input and three-input "and" gates to deliver at its output pulses representative of the sum or difference result; a first carry "and" gate with an input connected to the output Y of said first YN device; a second carry "and" gate with an input connected to the output N of said first YN device, another input of each of said carry "and" gates being connected to the output Y of said third YN device; a carry "or" buffer the inputs of which are connected to the outputs of both carry "and" gates and to the output Y of said second YN device; a carry circuit path between the output of said carry "or" buffer and one of said other inputs of the adder; control means controlling said carry "and" gates so that carry pulses are fed to said circuit path through the first carry "and" gate for addition or through the second carry "and" gate for subtraction.

2. Algebraic serial adder for adding or subtracting a binary number B to or from a binary number A, said numbers being represented by respective trains of entry pulses B and A, said adder comprising three pulse receiving "YN" devices, having each two outputs Y and N adapted to separately manifest the reception of an entry pulse or the non-reception of an entry pulse, the first YN device being connected to an input of the adder for uniquely receiving the pulses A, the second YN device receiving, from two other inputs of the adder the pulses B and carry pulses C produced by the adder itself, through a first "and" gate; the third YN device receiving said pulses B or said pulses C through a first "or" buffer; a pair of two-input "and" gates and one three-input "and" gate the inputs of which are differently connected to the outputs of said three YN devices; a second "or" buffer the inputs of which are connected to the outputs of said two-input and three-input "and" gates to deliver at its output pulses representative of the sum or difference result; a carry "and" gate with two inputs, one input being connected to the output Y of the third YN device; a carry "or" buffer the inputs of which are respectively connected to the output of said carry "and" gate and to the output Y of the second YN device; a carry circuit path including a delay element between the output of said carry "or" buffer and one of said other inputs of the adder; circuit control means made operative to connect the output Y of the first YN device to the second input of said carry "and" gate for addition and to connect the output N of the first YN device to said second input of the carry "and" gate for subtraction.

3. Algebraic serial adder for adding or subtracting a binary number B to or from a binary number A, said numbers being represented by respective series of entry pulses B and A, said adder comprising three pulse receiving "YN" devices, having each two outputs Y and N adapted to separately manifest the reception of an entry pulse and the non-reception of an entry pulse, the first YN device being connected to an input of the adder for exclusively receiving the pulses A, the second YN device receiving, from two other inputs of the adder, the pulses B and carry pulses C produced by the adder itself, through a first "and" gate; the third YN device receiving said pulses B or said pulses C through a first "or" buffer; a first carry "and" gate with an input connected to the output Y of said first YN device; a second carry "and" gate with an input connected to the output N of said first YN device, another input of each of said carry "and" gates being connected to the output Y of said third YN device; a carry "or" buffer the inputs of which are connected to the outputs of both carry "and" gates and to the output Y of said second YN device; a carry circuit path between the output of said carry "or" buffer and one of said other inputs of the adder; control means controlling said carry "and" gates so that carry pulses are fed to said circuit path through the first carry "and" gate for addition or through the second carry "and" gate for subtraction.

4. Algebraic serial adder for adding or subtracting a binary number B to or from a binary number A, said numbers being represented by respective trains of entry pulses B and A, said adder comprising three pulse receiving "YN" devices having each two outputs Y and N adapted to separately manifest the reception of an entry pulse and the non-reception of an entry-pulse, the first YN device being connected to an input of the adder for exclusively receiving the pulses A, the second YN device receiving, from two other inputs of the adder the pulses B and carry pulses C produced by the adder itself, through a first "and" gate; the third YN device receiving said pulses B or said pulses C through a first "or" buffer; a carry "and" gate with two inputs, one input being connected to the output Y of the third YN device; a carry "or" buffer the inputs of which are respectively connected to the output of said carry "and" gate and to the output Y of the second YN device; a carry circuit path including a delay element between the output of said carry "or" buffer and one of said other inputs of the adder; circuit control means operative to connect the output Y of the first YN device to the second input of said carry "and" gate for addition and to connect the output N of the first YN device to said second input of the carry "and" gate for subtraction.

5. Algebraïc serial adder for arithmetically combining two binary numbers A and B represented by trains of pulses A and B, comprising three pulses receiving "YN" devices, having each two outputs Y and N for separately manifesting the reception of a pulse or the non-reception of a pulse; the first YN device being connected to an input of the adder for uniquely receiving the pulses A, the second YN device receiving, from two other inputs of the adder the pulses B and carry pulses C produced by the adder itself, through a first "and" gate; the third YN device receiving said pulses B or said pulses C through a first "or" buffer; a second "and" gate, the inputs of which are connected to the outputs N of said first and second YN devices and to the output Y of said third YN device; a third "and" gate, the inputs of which are connected to the outputs Y of said first and second YN devices; a fourth "and" gate the inputs of which are respectively connected to the output Y of said first YN device and to the output N of said third YN device; a second "or" buffer, the inputs of which are connected to the outputs of said second, third, and fourth "and" gates, and the output of which "or" buffer delivering result pulses.

6. Serial adder for adding two binary numbers A and B represented by trains of pulses A and B, comprising three pulse receiving YN devices, having each two outputs for separately manifesting the reception of a pulse (Y) or the non-reception of a pulse (N); the first YN device being connected to an input of the adder for uniquely receiving the pulses A, the second YN device receiving, from two other inputs of the adder, the pulses B and carry pulses C produced by the adder itself, through a first "and" gate, the third YN device receiving said pulses B or said pulses C through a first "or" buffer; a carry "and" gate, the inputs of which are respectively connected to the outputs Y of said first and third YN devices, a carry "or" buffer, the inputs of which are respectively connected to the output of said carry "and" gate and to the output Y of said second YN device, the output of said carry "or" buffer being connected through a delay network to one of said other inputs of the adder for applying thereto carry pulses delayed by a binary period duration.

7. Serial adder for subtracting a binary number B from a binary number A, said numbers being represented by electrical pulses B and A, said adder comprising three pulse receiving "YN" devices having each two outputs Y and N for separately manifesting the reception of a pulse or the non-reception of a pulse; the first YN device being connected to an input of the adder for uniquely receiving the pulses A, the second YN device receiving from two other inputs of the adder the pulses B and carry pulses C produced by the adder itself through a first "and" gate, the third YN device receiving said pulses B or said pulses C through a first "or" buffer; a carry "and" gate, the inputs of which are respectively connected to the output N of said first YN device and to the output Y of the third YN device; a carry "or" buffer the inputs of which are respectively connected to the output of said carry "and" gate and to the output Y of said second YN device, the output of said carry "or" buffer being connected through a delay network to one of said other inputs of the adder for applying thereto carry pulses delayed by a binary period duration.

8. Algebraic serial adder for adding or subtracting a binary number B to or from a binary number A, said numbers being represented by respective series of entry pulses B and A, said adder comprising three pulse receiving YN devices, each with an input terminal and two output terminals, one (Y) of said output terminals being energized when an entry pulse is applied to said input terminal and the other (N) being energized when no entry pulse is applied to said input terminal, the input terminal of the first YN device being connected to an input of the adder for exclusively receiving the pulses A, the second YN device receiving, from two other inputs of the adder, the pulses B and carry pulses C produced by the adder itself, through a first "or" buffer; a first carry "and" gate with an input connected to the output Y of said first YN device; a second carry "and" gate with an input connected to the output N of said first YN device, another input of each of said carry "and" gates being connected to the output Y of said third YN device; a carry "or" buffer, the inputs of which are connected to the outputs of both carry "and" gates and to the output Y of said second YN device; a carry circuit path between the output of said carry "or" buffer and one of said other inputs of the adder; control means controlling said carry "and" gates so that carry pulses are fed to said circuit path through the first carry "and"

gate for addition or through the second carry "and" gate for subtraction.

References Cited in the file of this patent

UNITED STATES PATENTS

| | | | |
|---|---|---|---|
| 2,590,950 | Eckert | | Apr. 1, 1952 |
| 2,600,744 | Eckert | | June 17, 1952 |
| 2,609,143 | Stibitz | | Sept. 2, 1952 |

OTHER REFERENCES

High Speed Computing Machinery by Engineering Research Associates, Inc., July 28, 1950; pages 274–285; Figures 13–6 and 13–14.

"The Binac," Auerbach et al., Proceedings of the I. R. E., pages 19–20, January 1952.